F. H. GERDEMAN.
CLUTCH.
APPLICATION FILED JAN. 5, 1917.
1,324,501.
Patented Dec. 9, 1919.
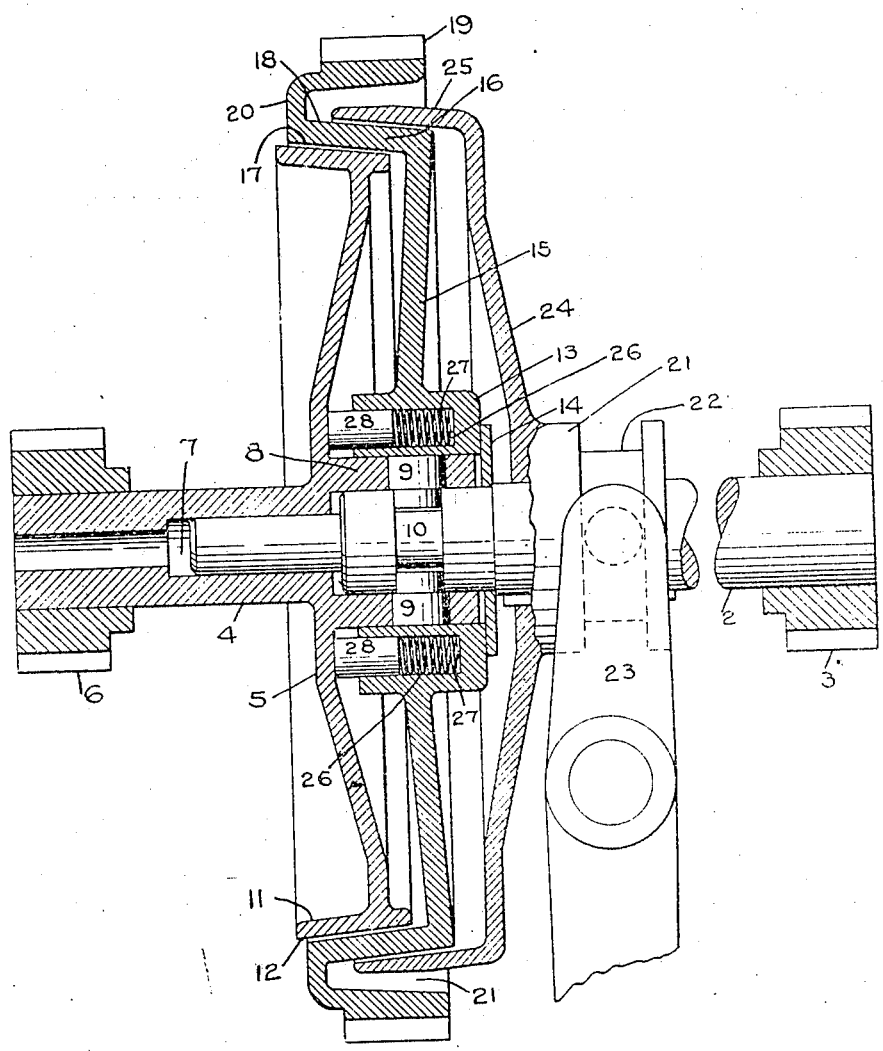
WITNESSES:
B. Hall
E. A. Paul
INVENTOR:
FRANK H. GERDEMAN
BY
ATTORNEYS.

UNITED STATES PATENT OFFICE.

FRANK H. GERDEMAN, OF FINDLAY, OHIO, ASSIGNOR, BY MESNE ASSIGNMENTS, TO BEEMAN TRACTOR COMPANY, OF MINNEAPOLIS, MINNESOTA, A CORPORATION OF MINNESOTA.

CLUTCH.

1,324,501.   Specification of Letters Patent.   Patented Dec. 9, 1919.

Application filed January 5, 1917. Serial No. 140,737.

*To all whom it may concern:*

Be it known that I, FRANK H. GERDEMAN, a citizen of the United States, residing at Findlay, county of Hancock, State of Ohio, have invented certain new and useful Improvements in Clutches, of which the following is a specification.

The object of my invention is to provide a clutch in which the friction members will have a wedging engagement with the surfaces against which they are clamped at substantially the same angle and area, and thereby the pressure of the friction members will be substantially uniform and danger of slippage of one of them independently of the other practically eliminated.

The invention consists generally in various constructions and combinations, all as hereinafter described and particularly pointed out in the claims.

In the accompanying drawings forming part of this specification,

The figure is a sectional view of a clutch embodying my invention.

In the drawing, 2 represents a shaft having a pinion 3 thereon. 4 is a stud provided on one side of a clutch member 5 and having a pinion 6 and a socket 7 to receive the end of the shaft 2. A hub 8 is mounted on the clutch 5 on the opposite side thereof from the stud 4 and a pin 9, mounted in said hub, has its inner end fitting an annular groove 10 in the shaft 2, thereby preventing relative longitudinal movement of the shaft and the stud 4, while permitting the hub 8 and the gear member to turn on the shaft. The clutch member 5 is provided with a peripheral rim 11 having a tapered friction surface 12 formed by flaring the peripheral rim 11 from one side of the clutch member to the other. This member, as indicated above, is held against longitudinal movement on the shaft and forms the normally stationary member of the clutch. A hub 13 has a loose bearing on the hub 8, being held in place thereon by suitable means, such as a washer 14. This hub 13 is provided with a radially projecting web 15. At the outer end of the hub 13 a flange 16 is formed, projecting laterally nearly at right angles to the plane of the web but with sufficient flare or divergence to correspond substantially to the flare of the surface 12 of the clutch member 5, said flange having an internal friction surface 17 parallel substantially with the surface 12 and adapted to contact therewith with a wedging pressure, so that when the web 15 is forced toward the member 5, these two opposing surfaces will grip one another and be firmly held together.

The flange 16 is also provided with an external friction surface 18 parallel substantially with the surface 17. The flange 16 is encircled by a gear 19 which is connected with the flange 16 by a web 20, an annular recess 21 being formed between the gear 19 and the friction surface 18. The hub 13, the web 15, the flange 16, the gear 19 and the web 20 are all preferably formed of one piece of metal.

The third member of the clutch comprises the hub 21' having the usual annular recess 22 for the forked end of the clutch operating lever 23 and the inner end of this hub has a web 24 radiating therefrom and terminating in a flange 25 which is adapted to enter the recess 21 and contact with the friction surface 18, the flange being flared slightly to correspond to the angle of the surface 18 and fit snugly thereon when the parts are pressed together. The flange 25 and the surface 18 will also have a wedging contact with one another.

When the members of the clutch are pressed together the surfaces 17 and 18 will be gripped with substantially the same pressure, increasing or decreasing with the movement of the hub 21' and consequently the clutch members will be held firmly without danger of slippage.

The following described mechanism, which I do not claim as part of my invention, is preferably provided for holding the hub 13 normally away from the clutch member 5 to prevent its friction surface 17 from contacting with the surface 12 until such time as it is desired to transmit power through the clutch. Recesses 26 are formed in the hub 13 to receive coiled springs 27 and balls (or, as shown) pins 28 which are yieldingly held against the clutch member 5 by the tension of said springs, the pressure of the springs being sufficient to normally hold the hub 13 against the washer 14 and prevent its engagement with the friction surface of the member 5.

The hub 13 normally bears on the washer 14, as plainly shown in the drawing, and said washer is spaced sufficiently from the hub 8 to allow movement of the hub 13 a sufficient distance to clamp the friction surface 17 against the surface of the normally stationary member of the clutch. This is accomplished through the movement of the hub 21'. A rocking movement of the arm 23 seats the clutch member 24 and continued pressure thereon forces the hub 13 toward the left until the friction surface 17 is seated on the surface 12 and thereupon all members of the clutch will be locked together for driving the gear 19. As soon as the clutch member 24 is withdrawn, the springs will separate the hub 13 from the member 5 and the gear 19 will then be idle.

I claim as my invention:

1. A friction clutch comprising two outer members having hubs and webs radiating therefrom, one of said members having a peripheral friction surface and normally stationary, the other outer member having a peripheral flange provided with an internal friction surface, a third member having a hub loosely mounted between said outer members and provided with a radial web and a flange in angular relation thereto between the peripheral friction surface of said normally stationary member and the internal friction surface of said outer member, said intermediate member having a gear encircling its flange and connected therewith, a space being formed between said gear and the flange of said third member to receive said peripheral flange, means interposed between said intermediate member and said normally stationary member for normally holding them apart with a yielding pressure, and the engagement of the internal friction surface of said other member with the opposing surface of said intermediate member forcing said intermediate member against said stationary member for locking them all together.

2. A friction clutch comprising two outer members having hubs and webs radiating therefrom, one of said members having a peripheral friction surface and normally stationary, the other outer member having a peripheral flange provided with a friction surface, a third member having a hub loosely mounted between said outer members and provided with a radial web and a flange in angular relation thereto between the friction surface of said normally stationary member and the friction surface of said outer member, said intermediate member having a gear encircling its flange and connected therewith, a space being provided between said gear and the flange of said third member to receive said peripheral flange, means for holding said intermediate member and said normally stationary member apart with a yielding pressure, the engagement of the friction surface of said other member with the opposing surface of said intermediate member forcing said intermediate member against said stationary member for locking them all together.

In witness whereof, I have hereunto set my hand this 20th day of December, 1916.

FRANK H. GERDEMAN.